United States Patent
Joglekar (10) Patent No.: US 9,934,028 B2
(45) Date of Patent: *Apr. 3, 2018

(54) TRACKING CHANGES WITHIN JAVASCRIPT OBJECT NOTATION

(71) Applicant: International Business Machines Corporation, Armonk, NY (US)

(72) Inventor: Amit P. Joglekar, Olathe, KS (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/401,495

(22) Filed: Jan. 9, 2017

(65) Prior Publication Data

US 2017/0153889 A1 Jun. 1, 2017

Related U.S. Application Data

(63) Continuation of application No. 14/953,496, filed on Nov. 30, 2015.

(51) Int. Cl.
*G06F 9/44* (2006.01)
*G06F 9/445* (2006.01)

(52) U.S. Cl.
CPC . *G06F 8/73* (2013.01); *G06F 8/24* (2013.01)

(58) Field of Classification Search
CPC ..... G06F 8/73; G06F 8/24; G06F 8/60; G06F 8/315
USPC ........................................................ 717/123
See application file for complete search history.

(56) References Cited

U.S. PATENT DOCUMENTS

| | | |
|---|---|---|
| 7,870,482 B2 | 1/2011 | Gnech et al. |
| 7,921,415 B1 | 4/2011 | Bodell et al. |
| 8,291,230 B2 | 10/2012 | Moore et al. |
| 8,533,665 B2 | 9/2013 | Yu et al. |
| 8,805,984 B2 | 8/2014 | Markus et al. |

(Continued)

FOREIGN PATENT DOCUMENTS

CN 102904887 B 1/2016

OTHER PUBLICATIONS

"JSONObject (Apache Sling Aggregate 5-incubator API)", Copyright 2007-2009, 16 pages, Downloaded Mar. 31, 2015, <https://sling.apache.org/apidocs/sling5/org/apache/sling/commons/json/JSONObject.html>.

(Continued)

*Primary Examiner* — Marina Lee
(74) *Attorney, Agent, or Firm* — Christopher McLane (57) ABSTRACT

The method includes adjusting, by one or more computer processors, a Javascript object notation structure to comprise a tag on at least one object and a tag on at least one array. The method further includes receiving, by one or more computer processors, data indicating a first set of at least one change to the Javascript object notation structure. The method further includes adjusting, by one or more computer processors, the tags in the Javascript object notation structure to include the first set of the at least one change in the Javascript object notation structure. The method further includes receiving, by one or more computer processor, data indicating the first set of the at least one change to the Javascript object notation structure is complete. The method further includes displaying the first set of the at least one change to the Javascript object notation structure based upon the adjusted tags.

1 Claim, 6 Drawing Sheets

(56) References Cited

U.S. PATENT DOCUMENTS

| | | |
|---|---|---|
| 9,171,092 B2 | 10/2015 | Kruglick |
| 9,535,691 B1* | 1/2017 | Joglekar .................. G06F 8/73 |
| 9,536,445 B2 | 1/2017 | Champion et al. |
| 9,594,731 B2 | 3/2017 | Zarzar et al. |
| 2009/0217150 A1 | 8/2009 | Lin |
| 2010/0185862 A1 | 7/2010 | Moore et al. |
| 2010/0242018 A1 | 9/2010 | Balfe et al. |
| 2012/0246190 A1 | 9/2012 | Surtani et al. |
| 2013/0166568 A1 | 6/2013 | Binkert et al. |
| 2014/0067866 A1 | 3/2014 | Chen |
| 2014/0164400 A1 | 6/2014 | Kruglick |
| 2014/0215306 A1 | 7/2014 | Chiculita et al. |
| 2015/0193402 A1 | 7/2015 | Ayoub et al. |
| 2016/0077853 A1 | 3/2016 | Feng et al. |
| 2017/0153887 A1* | 6/2017 | Joglekar .................. G06F 8/73 |
| 2017/0153888 A1* | 6/2017 | Joglekar .................. G06F 8/73 |
| 2017/0153889 A1* | 6/2017 | Joglekar .................. G06F 8/73 |

OTHER PUBLICATIONS

"JSON API:: Format", Generated on Mar. 29, 2015, 18 pages, <http://jsonapi.org/format/>.

"Introducing JSON", ECMA-404 The JSON Data Interchange Standard, 6 pages, Downloaded Mar. 31, 2015, <http://www.json.org/>.

Joglekar, Amit, P., "Tracking Changes Within Javascript Object Notation", U.S. Appl. No. 14/953,496, 34 Pages, filed Nov. 30, 2015.

Joglekar, Amit, P., "Tracking Changes Within Javascript Object Notation", U.S. Appl. No. 15/081,993, 30 Pages, filed Mar. 28, 2016.

Joglekar, Amit P., "Tracking Changes Within Javascript Object Notation", U.S. Appl. No. 15/401,414, 30 pages, filed Jan. 9, 2017.

Appendix P, List of IBM Patents or Patent Applications Treated as Related, 2 pages, dated Jan. 10, 2017.

* cited by examiner

```
1 {
2     "JSON_CHANGES_IN_THIS_OBJECT": {
3         "REMOVED_NAMES": [
4             "a",
5             "c"
6         ],
7         "b": true,
8         "f": 5
9     },
10    "e": {
11        "JSON_CHANGES_IN_THIS_OBJECT": {
12            "x": "str"
13        }
14    }
15 }
```

FIG. 3

```
1  {
2      "a": [
3          {
4              "VALUE_CHANGES": [
5                  [ 0, "str" ],
6                  [ 2, 40 ]
7              ]
8          },
9          [
10             1,
11             {
12                 "y": [
13                     {
14                         "POSITION_CHANGES": [
15                             [ "R", 2 ],
16                             [ "M", 0, 1 ],
17                             [ "I", 1 ]
18                         ],
19                         "VALUE_CHANGES": [
20                             [ 1, false ]
21                         ]
22                     }
23                 ]
24             }
25         ]
26     ]
27 }
```

FIG. 4

```
1 JSONObject json = new JSONObject("{\"a\" : 2, \"b\" : {\"u\" : 5, \"v\" : 6}}");
2
3 JSONChangeRecorder changeRecorder = new JSONChangeRecorder();
4 changeRecorder.startRecording( json );
5
6 // Make a change to the JSONObject named "b"
7 changeRecorder.setNameValuePair( json.getJSONObject( "b" ), "u", "str" );
8
9 // Set a newly created JSONObject as value for the name-value pair named "a"
10 changeRecorder.setNameValuePair( json, "a", new JSONObject( "{\"p\" : 11, \"q\" : 12, \"r\" : 13}" ) );
11
12 // Copy the pre-existing object named "b" inside the new JSONObject
13 changeRecorder.setNameValuePair( json.getJSONObject( "a" ), "q", json.getJSONObject( "b" ) );
```

FIG. 5

```
1 {
2      "JSON_CHANGES_IN_THIS_OBJECT": {
3           "a": {
4                "p": 11,
5                "q": "/JSON_ROOT/b/",
6                "r": 13
7           }
8      },
9      "a": {
10          "q": {
11               "JSON_CHANGES_IN_THIS_OBJECT": {
12                    "u": "str"
13               }
14          }
15     },
16     "b": {
17          "JSON_CHANGES_IN_THIS_OBJECT": {
18               "u": "str"
19          }
20     }
21 }
```

FIG. 6

```
1  {
2      "JSON_CHANGE_TRACKER": {
3          "INITIAL_VALUES": {
4              "a": "/JSON_ROOT/a/"
5          },
6          "JSON_ID": "/JSON_ROOT/"
7      },
8      "a": [
9          "str",
10         {
11             "JSON_CHANGE_TRACKER": {
12                 "INITIAL_VALUES": {
13                     "x": 30,
14                     "y": "/JSON_ROOT/a/[1]/y/"
15                 },
16                 "JSON_ID": "/JSON_ROOT/a/[1]/"
17             },
18             "x": 30,
19             "y": [
20                 35,
21                 false,
22                 32,
23                 {
24                     "INITIAL_VALUES": [
25                         35,
26                         "JSON_NEWLY_INSERTED_ARRAY_ENTRY",
27                         32
28                     ],
29                     "JSON_ID": "/JSON_ROOT/a/[1]/y/",
30                     "POSITION_CHANGES": [
31                         [ "R", 2 ],
32                         [ "M", 0, 1 ],
33                         [ "I", 1 ]
34                     ]
35                 }
36             ]
37         },
38         40,
39         {
40             "INITIAL_VALUES": [
41                 2,
42                 "/JSON_ROOT/a/[1]/",
43                 4
44             ],
45             "JSON_ID": "/JSON_ROOT/a/",
46             "POSITION_CHANGES": [
47             ]
48         }
49     ]
50 }
```

TRACKING CHANGES WITHIN JAVASCRIPT OBJECT NOTATION

BACKGROUND OF THE INVENTION

The present invention relates generally to JavaScript Object Notation, and more particularly to tracking changes within JavaScript Object Notation.

JavaScript Object Notation (JSON) is an open standard format that uses human-readable text to store or transmit data objects consisting of attribute value pairs and ordered list of values. It is used primarily to transmit data between a server and web application as an alternative to eXtensible Markup Language (XML). Although originally derived from the JavaScript scripting language, JSON is a language-independent data format. Code for parsing and generating JSON data is readily available in many programming languages.

JSON generally ignores any whitespace around or between syntactic elements (e.g., values and punctuation, but not within a string value). However, JSON only recognizes four specific whitespace characters: the space, horizontal tab, line feed, and carriage return. JSON does not provide or allow any sort of comment syntax.

SUMMARY

Embodiments of the present invention disclose a method, computer program product, and system for tracking changes in a Javascript object notation structure. In one embodiment, in accordance with the present invention, the computer-implemented method includes adjusting, by one or more computer processors, a Javascript object notation structure to comprise a tag on at least one object and a tag on at least one array. The method further includes receiving, by one or more computer processors, data indicating a first set of at least one change to the Javascript object notation structure. The method further includes adjusting, by one or more computer processors, the tags in the Javascript object notation structure to include the first set of the at least one change in the Javascript object notation structure. The method further includes receiving, by one or more computer processor, data indicating the first set of the at least one change to the Javascript object notation structure is complete. The method further includes displaying, by one or more computer processors, the first set of the at least one change to the Javascript object notation structure based upon the adjusted tags.

DETAILED DESCRIPTION

Embodiments of the current invention create a concise representation of changes in JSON format. Embodiments of the invention recognize that JSON is considered a concise format when compared to other relatively verbose prior formats like XML. Embodiments of the invention recognize that string representation of a JSON structure is very compact and hence easily transferable and sharable and storable. Embodiments of the invention recognize that use of JSON for change representation is advantageous. Embodiments, of the invention utilize JavaScript Object Notation (JSON), and capturing the changes using JavaScript Object Notation. As and when changes happen, the changes are tracked using JSON, and then after all changes have been made, the changes that have been made so far are captured using JSON as well. For the purposes of the application, a "collection of attribute-value pairs" is referred to as 'JSON object' and "ordered list of values" is referred to as 'JSON array'.

Implementation of embodiments of the invention may take a variety of forms, and exemplary implementation details are discussed subsequently with reference to the Figures.

Figure 1:
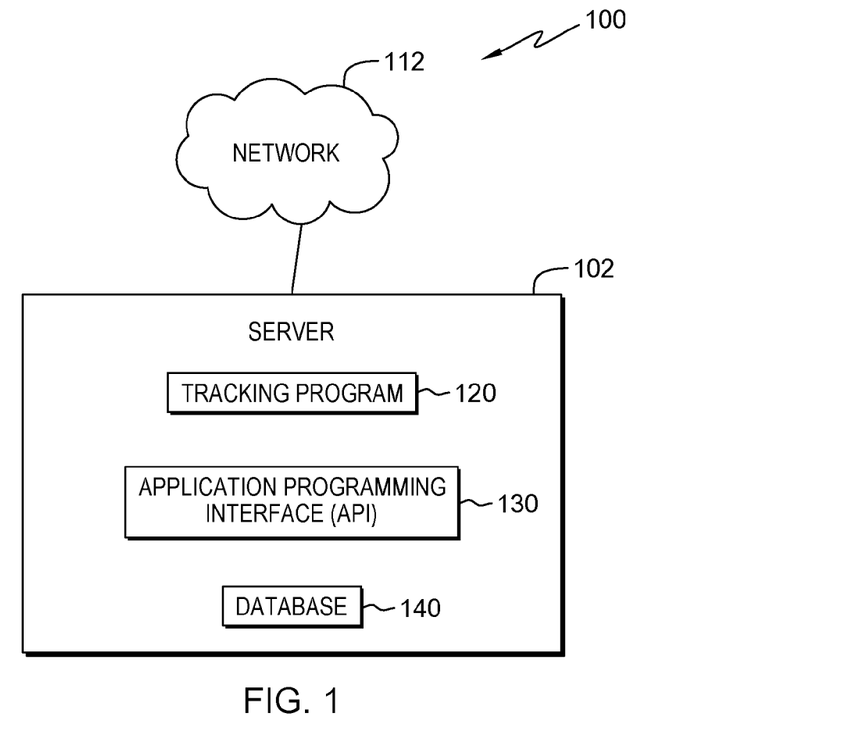
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102, connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 tracks changes to JavaScript™ Object Notation (JSON) format. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with network 112. In another embodiment, server 102 represents a computing system utilizing clustered computers and components to act as a single pool of seamless resources. Server 102 may include components, as depicted and described in further detail with respect to FIG. 8, in accordance with embodiments of the present invention. Server 102 includes tracking program 120, application programming interface (API) 130, and database 140.

In depicted distributed data processing environment 100, tracking program 120 resides on server 102 and tracks changes to JSON files. In various embodiments, tracking program 120 prepares a JSON structure for tracking changes and tracks changes made to the JSON structure. In some embodiments, tracking program 120 may monitor changes to a JSON on server 102, or changes to a JSON on another computing device (not depicted), via network 112. In an example, another computing device (not depicted) may have a JSON which is monitored by tracking program 120. In another embodiment, tracking program 120 may monitor databases and/or storage devices located on server 102 or another computing device to enable tracking program 120 to monitor changes to the JSON file located in the database and/or storage devices. In some embodiments, tracking program 120 monitors multiple JSON files. Tracking program 120 is depicted and described in further detail with respect to FIG. 2.

In depicted distributed data processing environment 100, API 130 resides on server 102. API 130 is a set of routines, protocols, and tools for building software applications. API 130 specifies how software components should interact and API 130 may be utilized when programming graphical user interface (GUI) components between a user and tracking program 120. In various embodiments, API 130 may contain functions that can be called upon to prepare a JSON for tracking changes (e.g., startChangeTracking( ) and stopChangeTracking( )) as well as functions that can be utilized for tracking the changes (e.g., setNameValuePair( ), insertValueAtIndex( )). In some embodiments, API 130 may represent multiple APIs or work in conjunction with APIs not depicted.

In the depicted embodiment, database 140 resides on server 102. In another embodiment, database 140 may reside elsewhere in distributed data processing environment 100, such as within one or more additional server(s) or devices (not shown), or independently as a standalone database that is capable of communicating with server 102 via network 112. A database is an organized collection of data. Database 140 is implemented with any type of storage device capable of storing data that is accessed and utilized by server 102, such as a database server, a hard disk drive, or a flash memory. In other embodiments, database 140 represents multiple storage devices within server 102. Database 140 stores information, such as JSON files containing tracked changes, various versions of JSON files, etc. In an example, database 140 stores information generated by tracking program 120.

Figure 2:
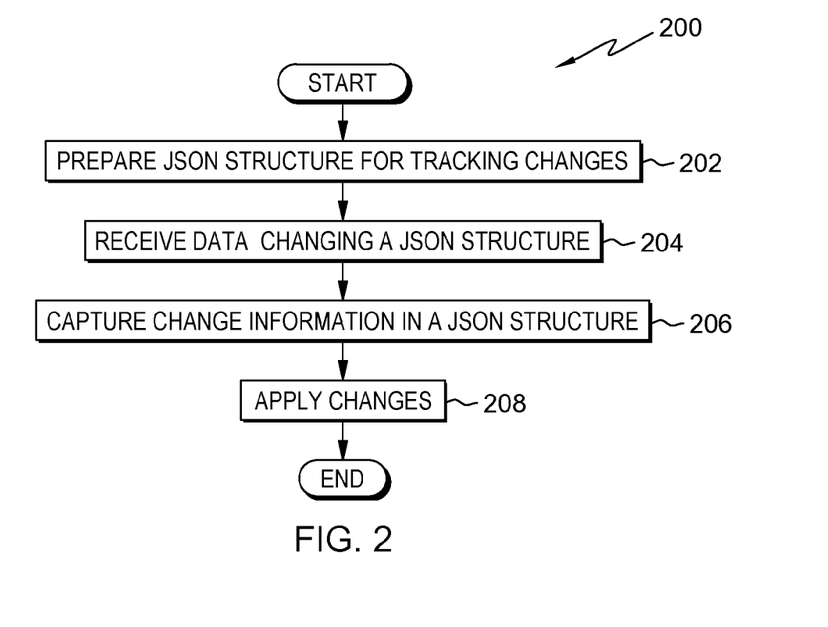
FIG. 2 is a flowchart depicting operational steps of a program for tracking changes within the distributed data processing environment of FIG. 1, in accordance with an embodiment of the present invention.

FIG. 2 is a flowchart depicting operational steps of program 200, which is a function of tracking program 120, in accordance with an embodiment of the present invention. Program 200 operates on server 102 and tracks changes to a JSON. In various embodiments, program 200 may track changes in multiple JSONs. In one embodiment, an administrator of tracking program 120 initiates the operational steps of program 200. In an example, a user of tracking program 120 initiates program 200 when the user begins to modify a JSON file. In another embodiment, tracking program 120 may initiate the operational steps of program 200 after a user of program 200 prompts program 200 to begin tracking changes to a JSON file.

Program 200 prepares the JSON structure for tracking changes (step 202). In some embodiments, an API may invoke the prepare operation (e.g., API named startChangeTracking(JSON)). In various embodiments, program 200 tags the objects (i.e., collection of attribute-value pairs) and arrays (i.e., ordered list of values) in the JSON structure to enable recording of the future changes to the JSON structure. In some embodiments, program 200 recursively traverses objects and arrays inside the JSON structure's hierarchy and adds a change tracker JSON object to each object and array. In an example, a special name-value pair (e.g., named JSON_CHANGE_TRACKER) is used to track changes inside a JSON object. The value corresponding to the name (e.g., JSON_CHANGE_TRACKER) is a JSON object (e.g., a change tracker object that is used for storing the information as described in paragraph 0022). In an example, a language specific JSON implementation may hide such a name-value pair stored in JSON object by ignoring the JSON_CHANGE_TRACKER name-value pair in an application programing interface (API) (e.g., object-.getAllNames( ) or object.toString( )). In some embodiments, changes inside a JSON array are tracked using a special JSON object (e.g., change tracker object that is used for storing the information as described in paragraph 0023) stored in the last array index. In an embodiment, the last array index is used so the element does not affect the index that needs to be specified during insert/remove/move operations on the array elements. In an example, a language specific JSON implementation may hide such an element stored in the last array index by ignoring the element in an array application programing interface (API) (e.g., array-.length( ) or array.toString( )).

Program 200 may also add an identifier name-value pair (e.g., named JSON_ID) to each object and array in the hierarchy of the JSON structure whose changes are to be tracked. In an example, the identifier may reside in the change tracker object mentioned in the previous paragraph. The JSON_ID enables program 200 to identify preexisting objects and arrays as opposed to newly added objects and arrays after changes to a JSON structure have been made. In the example, JSON_ID enables program 200 to identify original/initial positions of objects or arrays in the JSON structure. In some embodiments, the value corresponding to the JSON_ID (e.g., named JSON_ID), is a string that indicates the path in a JSON structure that must be traversed to reach an object or array. In an example, a value starts with the string "/JSON_ROOT/" and has "/" separated elements that must be traversed to reach an element whose JSON_ID is being created.

In another example, name in a name-value pair in an object, and array-index in an array, are used to compose the JSON_ID. In the previous example, JSON_ID may be assigned to elements in the JSON {"a":1, "b":[2, {"x":30, "y":[32, 35, 38]}, 4],"c":[5, 6]} as follows: The topmost object {"a":1, . . . } gets the JSON_ID "/JSON_ROOT/", the array [2, {"x":30, . . . ] gets the JSON_ID "/JSON_ROOT/b/", the object {"x":30, . . . } gets the JSON_ID "/JSON_ROOT/b/[1]/" (assuming zero based array indexes, index of '2' in the array is 0, whereas the index of object {"x":30, . . . } is 1). Similarly, array [32, 35, . . . ] gets the JSON_ID "/JSON_ROOT/b/[1]/y/" and so on. In some examples a file may not be in JSON format, and program 200 converts the file into a JSON file before adjusting the JSON structure for the file.

In step 202, program 200 creates the change tracker for each JSON object and JSON array in the JSON structure to enable recording of future changes to the JSON structure. In some embodiments, the created change tracker for a JSON object may be a special name-value pair (e.g., named JSON_CHANGE_TRACKER). The value corresponding to the name (e.g., JSON_CHANGE_TRACKER) is a JSON object. In an example, program 200 utilizes a name-value pair named "INITIAL_VALUES" that resides in the change tracker for recording initial values for the JSON object whose changes are to be tracked by the change tracker. Value corresponding to the name INITIAL_VALUES is a JSON object which has name-value pairs for each name and its initial value in the JSON object whose changes are to be tracked. Program 200 stores the initial value 'as is' if the value is of a simple type, such as string, number, boolean etc.; whereas JSON_ID of the initial value is stored if the initial value is a non-simple type such as a JSON object or a JSON array. In some embodiments, program 200 utilizes an initial value as a function of program 200, such as a change generator, to determine whether a change should be captured. For example, if the value in a name-value pair is initially 15, then the value is changed to 20 and then changed to 15 again, the value is not picked up by program 200 because no real change occurs. Program 200 may also use the initial values to determine whether a pre-existing name value pair has been removed.

In some embodiments, the change tracker for a JSON array may be a special JSON object stored in the last array index. During step 202 for a JSON array, a name-value pair named "INITIAL_VALUES" may be added to the change tracker for recording initial values of array elements. Value corresponding to the name INITIAL_VALUES is a JSON array equal to the size of the JSON array for which changes are being tracked. Program 200 stores the initial value 'as is' if the value is of a simple type, such as string, number, boolean etc.; whereas JSON_ID of the initial value is stored if the initial value is a non-simple type such as a JSON object or a JSON array.

In various embodiments, the change tracker for a JSON array may also have name-value pair having the name "POSITION_CHANGES", wherein the value is a JSON array which contains JSON arrays that indicate which index has been changed. In an example, program 200 adds a new element to the POSITION_CHANGES array for every array change that involves a change in position of one or more array elements (e.g., insert, remove, swap etc. operations). If a new element is inserted at index 2 then a JSON array ["I", 2] is added to the POSITION_CHANGES JSON array, where "I" indicates insert operation. If an element at index 4 is removed, then a JSON array ["R", 4] is added to the POSITION_CHANGES JSON array, where "R" indicates remove operation. Similarly, if elements at positions 3 and 6 are interchanged, then JSON array ["S", 3, 6] is added to POSITION_CHANGES JSON array, where "S" indicates swap operation. When the JSON structure is prepared for tracking changes (step 202), an empty POSITION_CHANGES array is initialized in the change tracker object.

Program 200 receives data changing a JSON structure (step 204). In various embodiments, program 200 may receive data changing a JSON structure via API 130. For example, setNameValuePair(JSON object, name, value), removeNameValuePair(JSON object, name), insertValueAtIndex(JSON array, index, value) etc. In some embodiments program 200 may actively receive from an API (e.g., API 130) and make changes to a JSON after receiving data from a user interface (UI) indicating a user is changing the JSON file. In another embodiment, program 200 may monitor a JSON for changes occurring to the structure. In some embodiments, program 200 may proceed to step 206 after each change to a JSON file that is detected by program 200 via an API (e.g., API 130). In other embodiments, program 200 may proceed to step 206 after receiving an indication from a user of program 200 via API (e.g., API 130) that all changes have been completed.

Program may record additional details inside the change tracker object when program 200 receives data changing a JSON structure through an API (e.g., API 130). For example, if changes to a JSON array involve position changes, then such changes may be captured in the POSITION_CHANGES array inside the change tracker. Also, such position changes may be made to the INITIAL_VALUES array as well to keep INITIAL_VALUES array in sync with the array whose changes are being tracked. In an example, if program 200 receives data changing a JSON structure by inserting an array element, program 200 inserts an array (e.g., ["I", 2] where "I" indicates insert operation at index 2) to POSITION_CHANGES array in change tracker. In another example, program 200 also inserts a special string, such as "JSON_NEWLY_INSERTED_ARRAY_ENTRY", at the corresponding index (e.g., index 2) in INITIAL_VALUES array in change tracker. In another example, if program 200 receives data changing a JSON structure by removing an array element, program 200 inserts an array (e.g., ["R", 4], where "R" indicates remove operation at index 4) to POSITION_CHANGES array in change tracker and program 200 also removes the entry at the corresponding index (e.g., index 4) in INITIAL_VALUES array in change tracker. In yet another example, if program 200 receives data changing a JSON structure by swapping values at two indexes in the array, program 200 inserts an array (e.g., ["S", 3, 6], where "S" indicates swapping of values at indexes 3 and 6) to POSITION_CHANGES array in change tracker, and program 200 also swaps values at corresponding indexes (e.g., indexes 3 and 6) in INITIAL_VALUES array in change tracker.

Program 200 captures change information in a JSON structure (step 206). In an embodiment, the JSON structure that represents changes that have been made to the JSON structure whose changes are being tracked, is referred to as change-JSON. In various embodiments, program 200 utilizes change information that has been recorded within tags (e.g., change tracker objects previously added to the JSON structure.) during steps 202 and 204. Step 206 may be initiated when a user indicates via an API (e.g., API 130) for program 200 to capture change information in the JSON structure. In some examples, a user may make multiple changes to the same object or array in a JSON structure, but program 200 only captures the iteration in existence when a user initiates step 206. In an example, if there is a first change to code, and then a subsequent change to a portion of common code, program 200 only captures the most recent change of the common code. Where the changes overlap, the most recent change is recorded.

Figure 3:
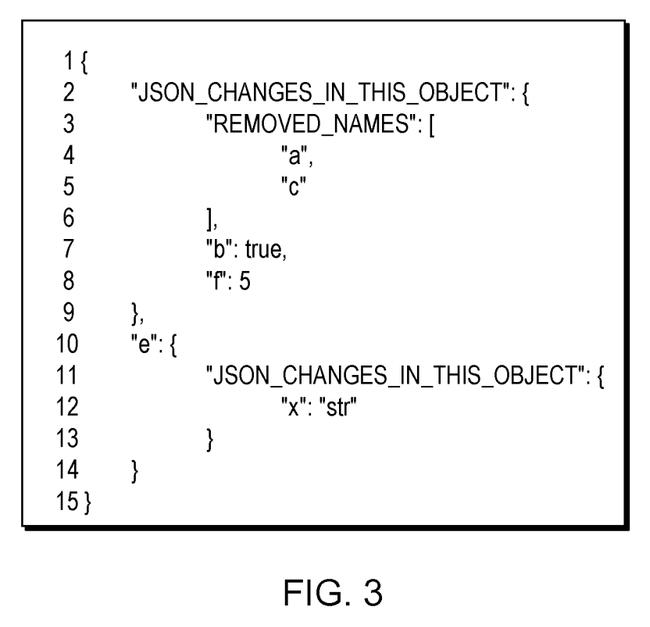
FIG. 3 represents an example of code utilized, in accordance with an embodiment of the present invention.

In an embodiment, program 200 only captures the final changed version of the JSON structure. In an example, a user may indicate via API 130 (e.g., captureChanges( )) to capture changes made to the JSON so far, then program 200 captures changes made to the JSON (step 206) beginning when tracking changes was turned on (e.g., step 'start' in FIG. 200). In some examples, changes inside a JSON object are represented using a JSON object. In a JSON object example, such as in FIG. 3 with lines 1-15, removed name-value pairs are represented using a name-value pair named "REMOVED_NAMES" on line 3 where the value is a JSON array containing the removed names in lines 3 to 6. In an example, the change generator function of program 200 determines the removed name-value pairs using the INITIAL_VALUES recorded in the change tracker during the 'prepare' step 202. If a name-value pair is in the INITIAL_VALUES JSON object but the name-value pair is not currently in the JSON object whose changes are being tracked, then program 200 adds the name to REMOVED_NAMES array. Program 200 may also compare current name-value pairs in the JSON object whose changes are being tracked with the name-value pairs in the INITIAL_VALUES JSON object and only capture the changed name-value pairs. As an example in FIG. 3, the change-JSON does not have the name-value pair named "d" because value, 4, of that name value pair was not changed. As previously stated, "The initial value may be stored 'as is' if the value is of a simple type, such as string, number, boolean etc.; whereas JSON_ID of the initial value may be stored if the initial value is a non-simple type such as a JSON object or a JSON array." In the example, program 200 may use JSON_ID of a current value in the JSON object for which changes are being tracked for comparison with the initial value stored in the INITIAL_VALUES object if the value is a non-simple type (i.e., a JSON object or JSON array).

In some embodiments, program 200 may use a hierarchical structure to represent captured changes. Program 200 may use a special name-value pair named "JSON_CHANGES_IN_THIS_OBJECT" (e.g., lines 2-9 in FIG. 3) to differentiate between the name-value pairs to be changed in an object and the name-value pairs that have to be traversed to go deeper in the hierarchy where other changed objects or arrays reside. In an example in FIG. 3, "e" has to be traversed to go deeper in the hierarchy where the change for name-value pair named "x" resides. In an example, of capturing changes, program 200 may capture removed name-value pairs which are represented using a name-value pair named "REMOVED_NAMES" where the value is a JSON array containing the removed names. In another example, program 200 may only capture the changed name-value pairs (e.g., a change-JSON does not have the name-value pair named (e.g., "d") because a value (e.g., 4) of that name-value pair was not changed. In yet another example, program 200 may use a hierarchical structure to capture changes. In the example, program 200 may use a special name-value pair named "JSON_CHANGES_IN_THIS_OBJECT" to differentiate between the name-value pairs to be changed in an object and the name-value pairs that have to be traversed to go deeper in the hierarchy where other changed objects or arrays reside (e.g., "e" has to be traversed to go deeper in the hierarchy where the change for name-value pair named "x" resides).

In some examples, changes inside a JSON array are represented using a JSON object. In the example object, two types of changes are captured, position changes are captured using a name-value pair named "POSITION_CHANGES" and value changes are captured using a name-value pair named "VALUE_CHANGES". In an example within FIG. 4 (containing lines 1-27), lines 3 to 8 did not have a change in element positions in the outerArray, so the JSON object does not have "POSITION_CHANGES" array. The value for names "POSITION_CHANGES" and "VALUE_CHANGES" is of type JSON array. In an example, position changes are already captured inside the change tracker object using a JSON array named "POSITION_CHANGES" as previously stated. Program 200 may directly use and copy the "POSITION_CHANGES" array created by program 200. In an example, in FIG. 4 lines 14 to 18 reflect the same POSITION_CHANGES array created by program 200 as lines 30 to 34 in FIG. 7. Program 200 may use the INITIAL_VALUES array to determine the value changes to be captured using the "VALUE_CHANGES" array. In an example, one JSON array is used for each changed index such as line 4-7 and lines 19-21 in FIG. 4. Program 200 captures a value change using a JSON array of size 2 where the first element is the array-index to be changed and the second element is the value to be assigned to the index. The "VALUE_CHANGES" array may contain a number of such arrays, one array for each changed index. As described before, if a new element is added to the array, program 200 may put a special string, such as "JSON_NEWLY_INSERTED_ARRAY_ENTRY", in the INITIAL_VALUES array at the index where the new element is added. In an example, if the value in INITIAL_VALUES array is "JSON_NEWLY_INSERTED_ARRAY_ENTRY", then program 200 captures the value at corresponding index in the JSON array whose changes are being tracked. In another example, program 200 may compare current values in JSON array whose changes are being tracked with the initial values stored in the INITIAL_VALUES array and only capture the changed values.

As previously stated, "The initial value may be stored 'as is' if the value is of a simple type, such as string, number, boolean etc.; whereas JSON_ID of the initial value may be stored if the initial value is a non-simple type such as a JSON object or a JSON array." In an embodiments, program 200 may use JSON_ID of the value at an index in the JSON array whose changes are being tracked for comparison with the value stored in the INITIAL_VALUES array if the value is a non-simple type (i.e., a JSON object or JSON array).

In an embodiment, program 200 may use a hierarchical structure to represent captured changes. If program 200 utilizes a hierarchical structure to represent captured changes, program 200 may differentiate between changes to be made to elements of an array and the elements that have to be traversed to go deeper in the hierarchy where other changed objects or arrays reside. In an example, changes inside a JSON array are represented using a JSON object. In the example object, two types of changes are captured—position changes are captured using a name-value pair named "POSITION_CHANGES" and value changes are captured using a name-value pair named "VALUE_CHANGES". In an example, no change occurs to element positions in the outerArray, so the JSON object does not have "POSITION_CHANGES" array. In an example, no change occurs to element values in the outerArray, so the JSON object does not have "VALUE_CHANGES" array. In another example, program 200 may directly use and copy the "POSITION_CHANGES" array created by program 200 if the exact same POSITION_CHANGES array was created by program 200 when recording changes in step 204. In yet another example, program 200 may utilize the INITIAL_VALUES array to determine the value changes to be captured using the "VALUE_CHANGES" array. The "VALUE_CHANGES" array may contain a number of such arrays, one array for each changed index. (e.g., multiple lines at different locations). In a further example, program 200 may use a hierarchical structure to represent captured changes. In the example, program 200 may differentiate between changes to be made to elements of an array and the elements that have to be traversed to go deeper in the hierarchy where other changed objects or arrays reside.

Figure 4:
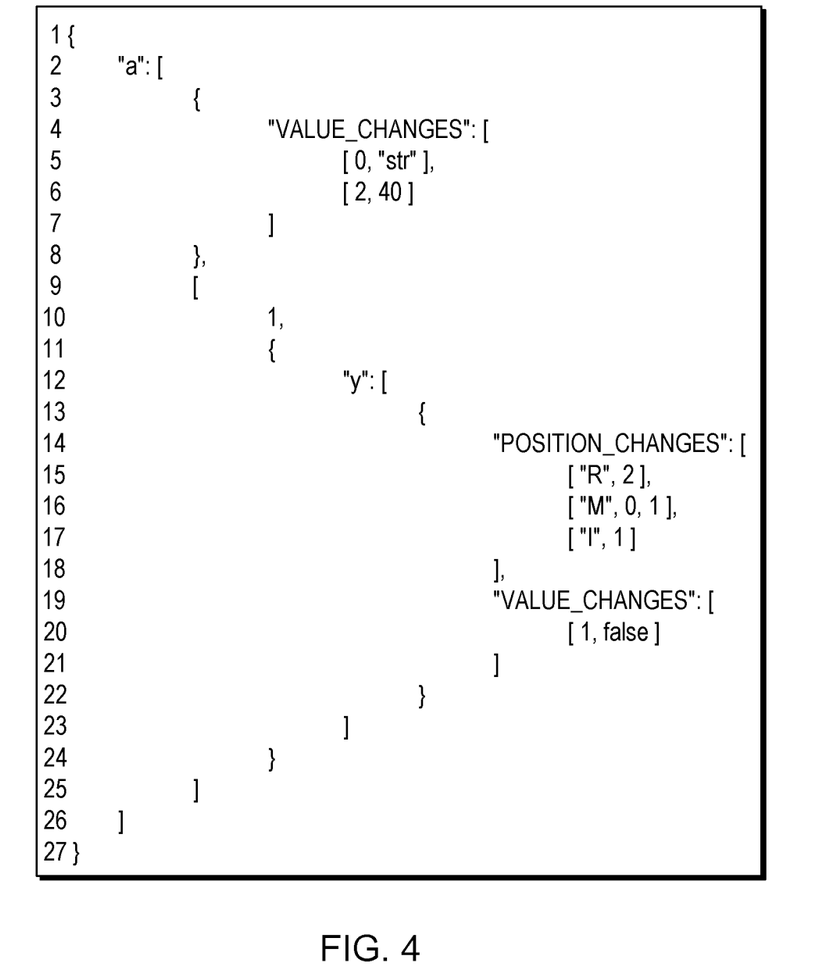
FIG. 4 represents an example of code utilized, in accordance with an embodiment of the present invention.

In an example from FIG. 4, hierarchical changes are represented using an example array between lines 2 and 26. In the example array, lines 3 to 8 is the first element which is a JSON object that has details about changes to the outerArray. Lines 9 to 25 is the second element which is a JSON array of size 2 that has details about deeper changes. First element in this array of size 2 is 1 (line 10) which is the index inside which the deeper changes reside, second element has details about the deeper changes. In this example, the second element indicates that deeper changes represented by POSITION_CHANGES and VALUE_CHANGES arrays are inside an array named "y".

If program 200 identifies a JSON object that does not have a change tracker, then program 200 captures all name-value pairs in the object because the object did not exist as part of the original JSON hierarchy whose changes are being tracked. Similarly, program 200 captures all elements in a JSON array that does not have a change tracker.

Program 200 applies changes (step 208). In various embodiments, program 200 applies changes from a first copy of the JSON structure to a second copy of the JSON structure. In some embodiments, multiple changes to the JSON structure may occur before program 200 applies changes from a first copy of the JSON structure to a second copy of the JSON structure. In an embodiment, when applying change-JSON to a copy of original JSON structure whose changes were tracked and captured, program 200 may traverse the JSON structure to identify which changes are to be applied and apply the changes to JSON objects and JSON arrays in the JSON structure. If the change-JSON also has hierarchical structure similar to the JSON structure to which the changes are to be applied, then program 200 may simultaneously traverse both JSON structures. Program 200 may first apply the changes captured in the "JSON_CHANGES_IN_THIS_OBJECT" name-value pair when applying changes in a JSON object. Program 200 may remove the name-value pairs listed in the "REMOVED_NAMES" array and change other name-value pairs listed in the "JSON_CHANGES_IN_THIS_OBJECT" object. Program 200 may then traverse deeper inside the name-value pairs in the JSON object to apply changes to other nested JSON objects and JSON arrays. Program 200 may first apply changes described in the "POSITION_CHANGES" array when applying changes in a JSON array. Then program 200 may make changes described in the "VALUE_CHANGES" array. Program 200 may then traverse deeper inside the elements of the JSON array to apply changes to other nested JSON objects and arrays.

Figure 5:
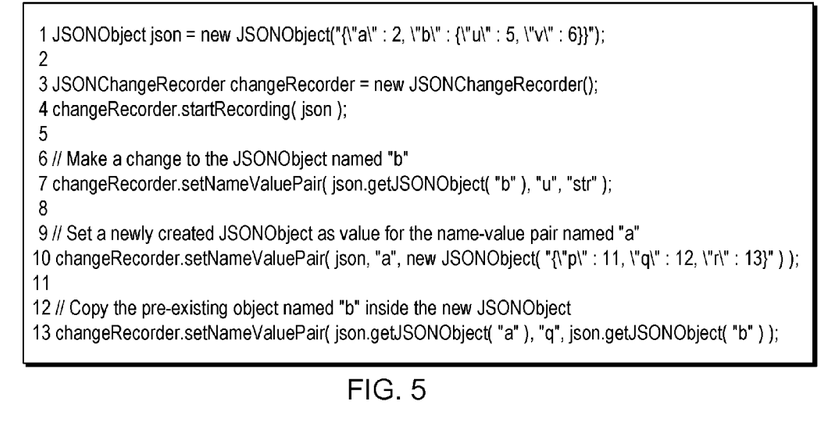
FIG. 5 represents an example of code utilized, in accordance with an embodiment of the present invention.
Figure 6:
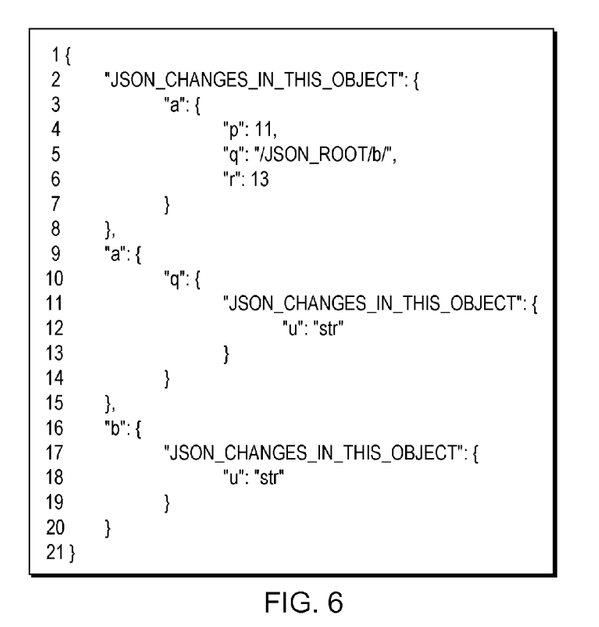
FIG. 6 represents an example of code utilized, in accordance with an embodiment of the present invention.

In some embodiments, JSON_ID may be used in the change-JSON when representing changes inside preexisting objects and arrays that have been moved or copied to some other location in the JSON structure. In various embodiments, program 200 may add a JSON_ID in the change-JSON. In an example in FIG. 5, if the value assigned is a pre-existing object, the value is represented by program 200 using JSON_ID (e.g., "/JSON_ROOT/b/" in line 5 of FIG. 6). In an example, FIG. 6 (containing lines 1-21) is the change-JSON created by program 200 for changes shown in example FIG. 5 (containing lines 1-13). Program 200 also captures the deeper changes to be made to the pre-existing object. In an example in FIG. 6 (containing lines 1-21), program 200 captures the deeper changes to be made to "q" in lines 9-15. In some examples, before program 200 starts making changes to the JSON structure, program 200 creates a copy of the original JSON structure. Program 200 uses this copy when processing the JSON_IDs in the change-JSON. When program 200 encounters a JSON_ID, program 200 copies that object/array as is from the copy of the original JSON structure. An example from FIG. 5 (containing lines 1-13) depicts program 200 assigns {\"u\":5, \"v\":6} to "q".

Figure 7:
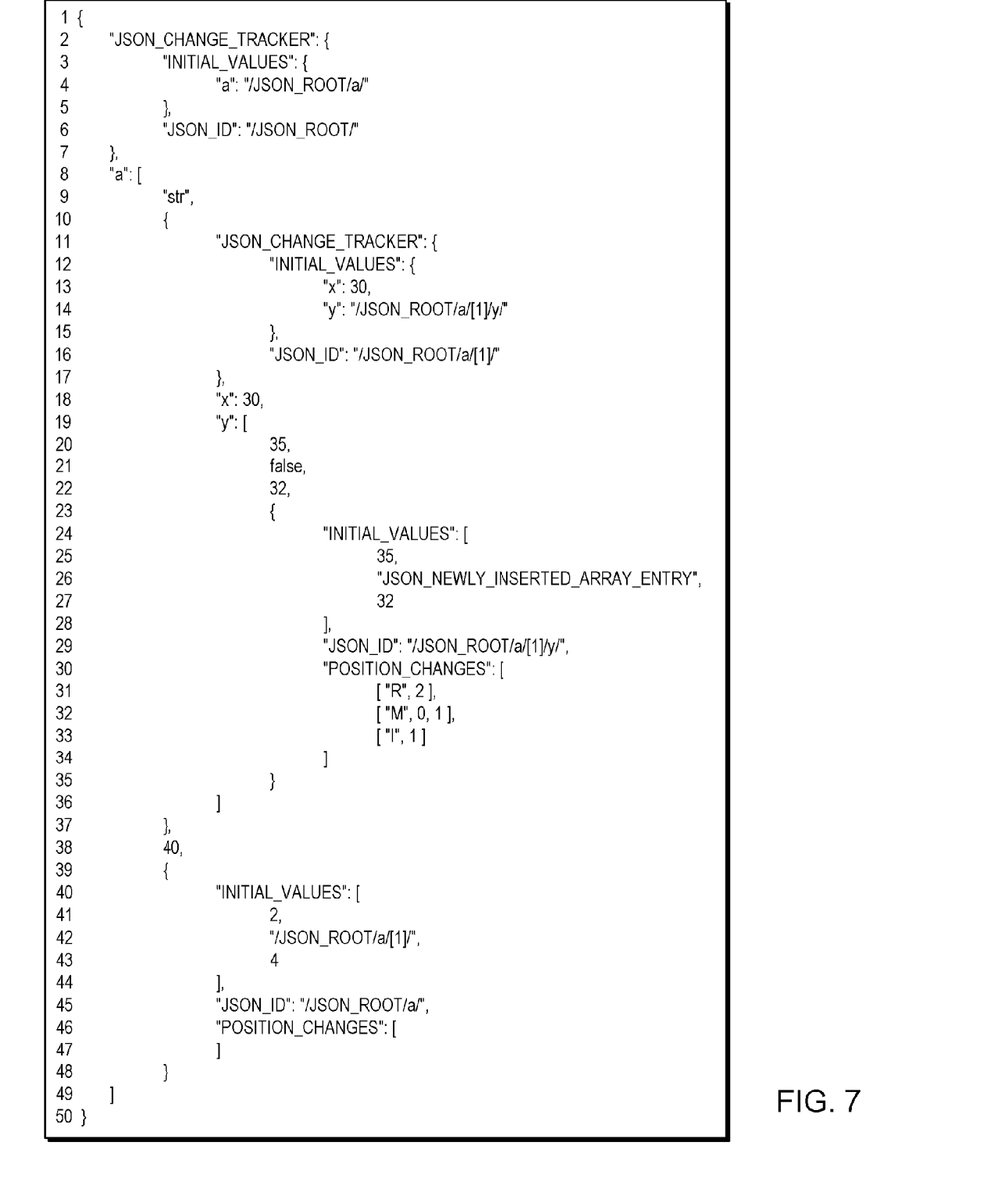
FIG. 7 represents an example of code utilized, in accordance with an embodiment of the present invention.

FIG. 7 depicts one example of program 200 consisting of lines 1-50. In the example, change tracker for JSON arrays is set at the last index in the array, lines 23-35 and lines 39-48. The ID is set inside the change tracker using a string named "JSON_ID" in lines 6, 16, 29, and 45. Initial values of name-value pairs in the JSON array are captured using name-value pair named "INITIAL_VALUES" inside the change tracker in lines 24 through 28, and lines 40 through 44. Simple values such as integers 2, 4, 35 etc. are captured directly, whereas JSON_ID is captured for complex types namely JSON objects and JSON arrays in line 42. A string "JSON_NEWLY_INSERTED_ARRAY_ENTRY" is inserted in the INITIAL_VALUES array at the corresponding index for each newly added element in the JSON array whose changes are being tracked. As and when position changes, such as removal of an element, swapping of elements etc., are made to the JSON array being tracked, those same position changes are made to the INITIAL_VALUES array to keep INITIAL_VALUES array in sync with the JSON array whose changes are being tracked. When JSON array is prepared, an empty POSITION_CHANGES array is added to JSON array in order to record future position changes lines 46 and 47. For each position change in the JSON array whose changes are being tracked, an array is added to the POSITION_CHANGES array to record the change lines 30 through 34. The rest of the JSON structure is always kept updated as per changes that have been.

In some embodiments a user may invoke an API via a user interface (not depicted) which displays the captured changes on a first JSON structure before or after applying the changes to a second JSON structure. In some embodiments, program 200 may not apply the changes to the second copy of the JSON structure but rather store the captured changes in a database (e.g., database 140). In an example, the JSON structure captured multiple changes to the structure via in memory programmatic representations in the JSON structure, which are displayed in a string representation to a user via a user interface. The user may then either select to apply the changes to the JSON structure, to store the changes as a string representation, store the changed JSON, or not apply the changes.

Figure 8:
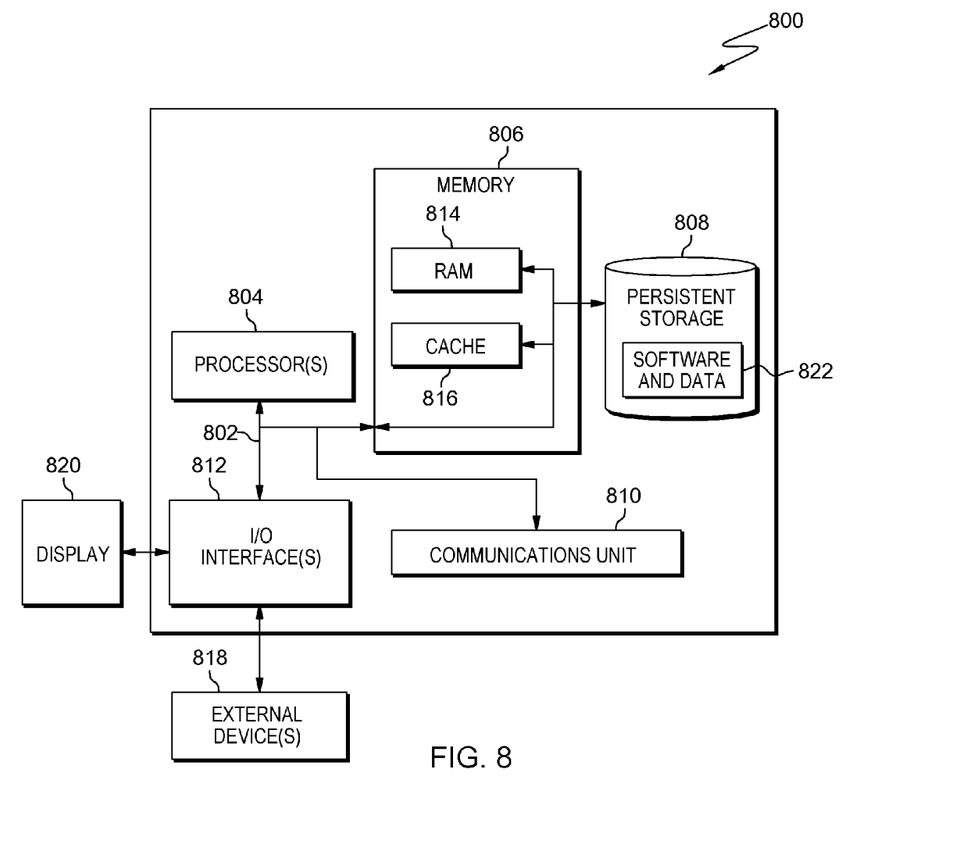
FIG. 8 depicts a block diagram of components of a test device and a server of FIG. 1, in accordance with an embodiment of the present invention.

FIG. 8 depicts a block diagram of components of computer 800, which is representative of server 102, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computer 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications, and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media. Software and data 822 are stored in persistent storage 808 for access and/or execution by processor(s) 804 via one or more memories of memory 806. With respect to server 102, software and data 822 represents tracking program 120 and database 140.

In this embodiment, persistent storage 808 includes a magnetic hard disk drive. Alternatively, or in addition to a magnetic hard disk drive, persistent storage 808 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Software and data 822 may be downloaded to persistent storage 808 through communications unit 810.

I/O interface(s) 812 allows for input and output of data with other devices that may be connected to computer 800. For example, I/O interface(s) 812 may provide a connection to external device(s) 818 such as a keyboard, a keypad, a touch screen, and/or some other suitable input device. External device(s) 818 can also include portable computer readable storage media such as, for example, thumb drives, portable optical or magnetic disks, and memory cards. Software and data 822 can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for tracking changes in a JAVASCRIPT object notation structure, the computer system comprising:
   one or more computer processors;
   one or more computer readable storage media;
   program instructions stored on the computer readable storage media for execution by at least one of the one or more computer processors, the program instructions comprising:
   program instructions to adjust a JAVASCRIPT object notation structure to comprise a tag on at least one object and a tag on at least one array, wherein adjusting a JAVASCRIPT object notation structure comprises creating, by one or more computer processors, a tag on each object and array in the JAVASCRIPT object notation structure for tracking changes to the JAVASCRIPT object notation structure;
   program instructions to receive data indicating a first set of at least one change to the JAVASCRIPT object notation structure, wherein receiving data indicating a first set of at least one change to the JAVASCRIPT object notation structure comprises:
   program instructions to receive at least one change to more than one objects; and
   program instructions to receive at least one change to more than one arrays;
     program instructions to adjust the tags in the JAVASCRIPT object notation structure to include the first set of the at least one change in the JAVASCRIPT object notation structure;
     program instructions to receive data indicating the first set of the at least one change to the JAVASCRIPT object notation structure is complete;
     program instructions to display the first set of the at least one change to the JAVASCRIPT object notation structure based upon the adjusted tags;
     program instructions to change the JAVASCRIPT object notation structure based upon the first set of the at least one completed changes to the JAVASCRIPT object notation structure;
     program instructions to receive a second set of at least one change to the JAVASCRIPT object notation structure, wherein the second set and the first set include a change to a common component in the code;
     program instructions to adjust the tags to replace the first set of the at least one change to the JAVASCRIPT object notation structure with the received second set of at least one change to the JAVASCRIPT object notation structure that overlap with the first set of the at least one change to the JAVASCRIPT object notation structure;
     program instructions to receive a third set of at least one change to the JAVASCRIPT object notation structure, wherein the third set, the first set, and the second set include a change to a common component in the code;
     program instructions to adjust the tags to the JAVASCRIPT object notation structure to replace the first set of at least one change and the second set of at least one change that overlap with the third set of at least one change; and
     program instructions to change the JAVASCRIPT object notation structure based upon the adjusted tags to the JAVASCRIPT object notation structure to replace the first set of at least one change and the second set of at least one change that overlap with the third set of at least one change.

* * * * *